US012273583B2

(12) United States Patent
Chan et al.

(10) Patent No.: US 12,273,583 B2
(45) Date of Patent: Apr. 8, 2025

(54) METHODS, SYSTEMS, AND MEDIA FOR PROVIDING DYNAMIC MEDIA SESSIONS

(71) Applicant: Google LLC, Mountain View, CA (US)

(72) Inventors: Chris Chan, San Francisco, CA (US); Kenneth J. Mackay, Sunnyvale, CA (US); James Carroll West, Mountain View, CA (US); Tavis A. Maclellan, Richmond, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/620,333

(22) PCT Filed: Dec. 2, 2019

(86) PCT No.: PCT/US2019/063938
§ 371 (c)(1),
(2) Date: Dec. 17, 2021

(87) PCT Pub. No.: WO2020/256766
PCT Pub. Date: Dec. 24, 2020

(65) Prior Publication Data
US 2022/0210502 A1 Jun. 30, 2022

Related U.S. Application Data

(60) Provisional application No. 62/862,416, filed on Jun. 17, 2019.

(51) Int. Cl.
*H04N 21/43* (2011.01)
*H04N 21/436* (2011.01)

(52) U.S. Cl.
CPC . *H04N 21/43078* (2020.08); *H04N 21/43074* (2020.08); *H04N 21/43615* (2013.01)

(58) Field of Classification Search
CPC ....... H04N 21/43078; H04N 21/43074; H04N 21/43615
See application file for complete search history.

(56) References Cited

U.S. PATENT DOCUMENTS 10,664,772 B1 * 5/2020 Poel .................... G06F 3/04842
2007/0214229 A1 9/2007 Millington et al.
(Continued)

FOREIGN PATENT DOCUMENTS

| CN | 107710770 A | 2/2018 |
|---|---|---|
| JP | 2008244869 A | 10/2008 |

(Continued)

OTHER PUBLICATIONS

Examination Report dated Apr. 29, 2022 in IN Patent Application No. 202247000320.
(Continued)

*Primary Examiner* — Joshua D Taylor
(74) *Attorney, Agent, or Firm* — Kilpatrick Townsend & Stockton LLP

(57) ABSTRACT

Methods, systems, and media for providing dynamic media sessions are provided. In some embodiments, the method comprises: transmitting, from a leader device to follower devices that each belong to a group of media playback devices in a group media playback session, control instructions that cause a media content item to be synchronously presented with the leader device and the follower devices in the group of media playback devices; during the synchronous presentation of the media content item, receiving an indication to halt presentation of the media content item by the leader device; in response to receiving the indication and in response to determining that the leader device is to remain the leader device of the group of media playback devices, halting the presentation of the media content item on the leader device while continuing to transmit updated control (Continued)

instructions that cause the media content item in the group media playback session to continue being synchronously presented on the follower devices remaining in the group of media playback devices.

23 Claims, 6 Drawing Sheets

(56) References Cited

U.S. PATENT DOCUMENTS

| | | | |
|---|---|---|---|
| 2010/0151783 A1 | 6/2010 | Cohen | |
| 2010/0284389 A1 | 11/2010 | Ramsay et al. | |
| 2011/0055901 A1 | 3/2011 | Karaoguz et al. | |
| 2011/0131599 A1 | 6/2011 | Lee | |
| 2014/0093219 A1 | 4/2014 | Trivedi | |
| 2014/0149544 A1 | 5/2014 | Le Nerriec et al. | |
| 2014/0181202 A1 | 6/2014 | Gossain | |
| 2015/0281800 A1 | 10/2015 | Luthra et al. | |
| 2018/0124136 A1* | 5/2018 | Faulkner | H04N 7/15 |
| 2018/0262792 A1 | 9/2018 | Mackay et al. | |
| 2018/0335903 A1* | 11/2018 | Coffman | G06F 3/0414 |
| 2019/0124159 A1 | 4/2019 | Alsina et al. | |

FOREIGN PATENT DOCUMENTS

| | | |
|---|---|---|
| JP | 2009165092 A | 7/2009 |
| JP | 2016532892 A | 10/2016 |
| JP | 2018502477 A | 1/2018 |
| JP | 2018-202477 A | 12/2018 |
| WO | WO 2005013047 | 2/2005 |
| WO | WO 2017058654 | 4/2017 |
| WO | WO 2018213401 | 11/2018 |
| WO | 2019/050769 A1 | 3/2019 |
| WO | WO 2019050769 | 3/2019 |
| WO | 2019/067131 A1 | 4/2019 |
| WO | WO 2019067131 | 4/2019 |

OTHER PUBLICATIONS

Examination Report dated May 24, 2022 in EP Patent Application No. 19827990.3.
Office Action dated Jan. 19, 2022 in CA Patent Application No. 3,143,942.
Office Action dated Mar. 28, 2022 in KR Patent Application No. 10-2022-7001576.
International Search Report and Written Opinion dated Mar. 16, 2020 in International Patent Application No. PCT/US2019/063938.
Notice of Grounds for Rejection for JP Appln No. 2021-575426 mailed Jul. 26, 2022, all pages.
Notice of Office Action from the Korean Intellectual Property Office for Appln No. 10-2022-7001576 mailed Aug. 22, 2022, all pages.
Notification of First Office Action for CN Appln No. 201980097672.X issued Jan. 18, 2023, all pages.
Notice of Decision to Grant Received Jul. 18, 2024, for JP2023-078286.
Notice of Allowance for Canadian Application No. 3,143,942 mailed Jun. 28, 2022, all pages.
Notice of Grant for Chinese Application No. 201980097672 issued Jul. 31, 2023, all pages.
Communication under Rule 71(3) EPC for European Application No. 19827990 mailed Feb. 21, 2024, all pages.
Notice of Decision to Grant for Japanese Application No. 2021-575426 issued Feb. 14, 2023, all pages.
Notice of Decision to Grant for Korean Application No. 10-2022-7001576 issued Dec. 12, 2022, all pages.
Notice of Decision to Grant for Korean Application No. 10-2648336 issued Dec. 12, 2023, all pages.

* cited by examiner

METHODS, SYSTEMS, AND MEDIA FOR PROVIDING DYNAMIC MEDIA SESSIONS

CROSS-REFERENCE TO RELATED APPLICATION

This application is a 371 National Stage filing of PCT Patent Application No. PCT/US2019/063938, filed Dec. 2, 2019, which claims the benefit of U.S. Provisional Application No. 62/862,416, filed Jun. 17, 2019, which is hereby incorporated by reference herein in its entirety.

TECHNICAL FIELD

The disclosed subject matter relates to methods, systems, and media for providing dynamic media sessions. More particularly, the disclosed subject matter relates to dynamically modifying a group playback session with a group of media playback devices. In particular, the proposed solution may facilitate allowing a leader playback device on which media content playback was initiated to be removed from the group playback session and allowing the leader playback device to participate in another media session.

BACKGROUND

With the increase in networked media devices, users may generally be interested in combining multiple devices to consume media content, thereby creating a richer media experience. For example, a user may be interested in playing music on a group of audio devices located in different rooms of a house (e.g., a kitchen and a dining room, a kitchen and a living room, etc.). In some cases, synchronized presentation of media content using a group of devices can require that one device serve as a leader, while other devices serve as followers, for example, to maintain synchrony of playback of the media content across all of the devices.

However, it can sometimes be difficult to remove a device from a group of devices that are concurrently presenting media content. For example, in a case where a kitchen audio device and a pair of living room audio devices are concurrently playing music and where the kitchen audio device acts as the leader device and the living room audio devices act as follower devices, it can be difficult to remove the kitchen audio device from the group of audio device. In continuing this example, upon removing the kitchen audio device, the media content may stop being presented to the group of devices. That is, it can be difficult to maintain a media playback session with a group of devices when a user no longer wants a leader device of the group of devices to concurrently present media content to the group of devices.

Accordingly, it is desirable to provide new methods, systems, and media for providing dynamic media sessions.

SUMMARY

Methods, systems, and media for providing dynamic media sessions are provided.

In accordance with some embodiments of the disclosed subject matter, a method for media playback is provided, the method comprising: transmitting, from a leader device to a plurality of follower devices that each belong to a group of media playback devices in a group media playback session, control instructions that cause a media content item to be synchronously presented with the leader device and each of the plurality of follower devices in the group of media playback devices; during the synchronous presentation of the media content item, receiving an indication to halt presentation of the media content item by the leader device; in response to receiving the indication to halt presentation of the media content item by the leader device, determining whether the leader device is to remain the leader device of the group of media playback devices in the group media playback session; and, in response to determining that the leader device is to remain the leader device of the group of media playback devices, halting the presentation of the media content item on the leader device while continuing to transmit updated control instructions that cause the media content item in the group media playback session to continue being synchronously presented on the plurality of follower devices remaining in the group of media playback devices.

In some embodiments, the presentation of the media content item on the leader device is halted by relinquishing one or more media resources used by a media playback application executing on the leader device to present the media content item on the leader device.

In some embodiments, the media playback application is an audio playback application and wherein the one or more media resources include an audio resource.

In some embodiments, the media playback application is a video playback application that presents the media content item on a display associated with the leader device, and wherein the one or more media resources include a screen resource for presenting information using the display of the leader device.

In some embodiments, the media content item is presented by the leader device executing a first media playback application and wherein, in response to determining that the leader device is to remain the leader device of the group of media playback devices, the method further comprises: receiving, at the leader device, a request to initiate a media playback session including a second media content item; and, in response to receiving the request to initiate the media playback session including the second media content item, launching a second media playback application to present the second media content item, wherein the second media playback application is executing concurrently with the first media playback application on the leader device.

In some embodiments, the media playback session that includes the second media content item is a second group playback session with a second plurality of follower devices and wherein the leader device and the second plurality of follower devices are grouped in a second group of media playback devices.

In some embodiments, the second media playback application is configured to transmit control instructions that cause the second media content item to be synchronously presented with the leader device and each of the second plurality of follower devices in the second group of media playback devices while concurrently using the first media playback application to transmit the updated control instructions that cause the media content item in the group media playback session to continue being synchronously presented on the plurality of follower devices remaining in the group of media playback devices.

In some embodiments, the method further comprises receiving an indication that the one or more media resources are no longer being used at an application manager executing on the leader device, wherein the second media playback application initiates the presentation of the second media content item in response to receiving the request to initiate the media playback session including the second media content item and in response to receiving the indication that the one or more media resources are no longer being used.

In some embodiments, the method further comprises: inhibiting the first media application from being visible on the leader device in response to receiving the indication to halt presentation of the media content item by the leader device, wherein the first media application was in a visible state when the media content item was being synchronously presented on the leader device and each of the plurality of follower devices in the group of media playback devices; and setting the second media application as a current media playback application for presenting the second media content item, wherein the second media application is in a visible state on leader device.

In some embodiments, the first media playback application and the second media playback application are instances of the same media playback application.

In some embodiments, the method further comprises, in response to determining that the leader device is not to remain the leader device of the group of media playback devices, determining whether a follower device in the group of media playback devices is capable of being designated as the leader device.

In some embodiments, the method further comprises, in response to determining that the follower device is capable of being designated as the leader device: causing a media playback application executing on the leader device to perform a stream transfer of a stream of content corresponding to the media content item to a follower device in the group of media playback devices by transmitting a control instruction to the follower device that: designates the follower device as an updated leader device; causes the media playback application to execute on the updated leader device; and transfers the group media playback session such that the updated leader device is configured to transmit the updated control instructions via the first media playback application that cause the media content item to be synchronously presented with the updated leader device and each of the plurality of follower devices remaining in the group of media playback devices; and removing the leader device from the group of media playback devices that are participating in the group media playback session.

In some embodiments, the method further comprises, in response to determining that the leader device is not to remain the leader device of the group of media playback devices, dynamically modifying the group media playback session by: updating the group media playback session by indicating an updated leader device associated with the group media playback session; transferring the group media playback session such that the updated leader device is configured to transmit the updated control instructions via the first media playback application that cause the media content item to be synchronously presented with the updated leader device and each of the plurality of follower devices remaining in the group of media playback devices; and removing the leader device from the group of media playback devices that are participating in the group media playback session.

In accordance with some embodiments of the disclosed subject matter, a system for media playback is provided, the system comprising a leader device having a hardware processor that: transmits, from a leader device to a plurality of follower devices that each belong to a group of media playback devices in a group media playback session, control instructions that cause a media content item to be synchronously presented with the leader device and each of the plurality of follower devices in the group of media playback devices; during the synchronous presentation of the media content item, receives an indication to halt presentation of the media content item by the leader device; in response to receiving the indication to halt presentation of the media content item by the leader device, determines whether the leader device is to remain the leader device of the group of media playback devices in the group media playback session; and, in response to determining that the leader device is to remain the leader device of the group of media playback devices, halts the presentation of the media content item on the leader device while continuing to transmit updated control instructions that cause the media content item in the group media playback session to continue being synchronously presented on the plurality of follower devices remaining in the group of media playback devices.

In accordance with some embodiments of the disclosed subject matter, a non-transitory computer-readable medium containing computer-executable instructions that, when executed by a processor, cause the processor to perform a method for media playback is provided, the method comprising: transmitting, from a leader device to a plurality of follower devices that each belong to a group of media playback devices in a group media playback session, control instructions that cause a media content item to be synchronously presented with the leader device and each of the plurality of follower devices in the group of media playback devices; during the synchronous presentation of the media content item, receiving an indication to halt presentation of the media content item by the leader device; in response to receiving the indication to halt presentation of the media content item by the leader device, determining whether the leader device is to remain the leader device of the group of media playback devices in the group media playback session; and, in response to determining that the leader device is to remain the leader device of the group of media playback devices, halting the presentation of the media content item on the leader device while continuing to transmit updated control instructions that cause the media content item in the group media playback session to continue being synchronously presented on the plurality of follower devices remaining in the group of media playback devices.

In accordance with some embodiments of the disclosed subject matter, a system for media playback is provided, the system comprising: means for transmitting, from a leader device to a plurality of follower devices that each belong to a group of media playback devices in a group media playback session, control instructions that cause a media content item to be synchronously presented with the leader device and each of the plurality of follower devices in the group of media playback devices; means for receiving an indication to halt presentation of the media content item by the leader device during the synchronous presentation of the media content item; means for determining whether the leader device is to remain the leader device of the group of media playback devices in the group media playback session in response to receiving the indication to halt presentation of the media content item by the leader device; and, in response to determining that the leader device is to remain the leader device of the group of media playback devices, means for halting the presentation of the media content item on the leader device while continuing to transmit updated control instructions that cause the media content item in the group media playback session to continue being synchronously presented on the plurality of follower devices remaining in the group of media playback devices.

Based on the proposed solution, the flexibility of using a leader device, e.g., a leader playback device for more than one group of media playback devices, may be increased. For example, using a device as a leader device in another, second media session of another, second group of media playback devices without losing a connection to and a leading role in a first media session of a first group of media playback devices may be facilitated. The proposed solution may in particular facilitate switching of a leader device from a first operating state in which the leader device has a leading role in a first group of media playback device to a second operating state in which the leader device has an additional leading role in a second group of media playback device.

In some embodiments, in response to receiving a request to halt presentation of media content on a leader device or otherwise be removed from the group of devices and in response to determining that the leader device is to remain the leader device for the group of devices, the leader device may stop a local presentation, in particular a local playback of the media content on the leader device. For example, the leader device may stop the local playback of the media content on the leader device by releasing one or more presentation/media resources used by a media playback application executing on the leader device. This may also include the media playback application to be further executed on the leader device as a hidden media playback application, where the hidden media playback application can continue to transmit control instructions to the follower devices for synchronously presenting the media content.

For example, in some embodiments, the leader device may launch a second instance of the media playback application for presenting media content on the leader device and/or one or more follower devices (e.g., in a visible state) while concurrently executing a first instance of the media playback application for transmitting control instructions to the follower devices for synchronously presenting the media content in a previous group media playback session (e.g., in a hidden state). A first instance and a second instance of a media playback application may in this context also be considered as first and second media playback applications.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
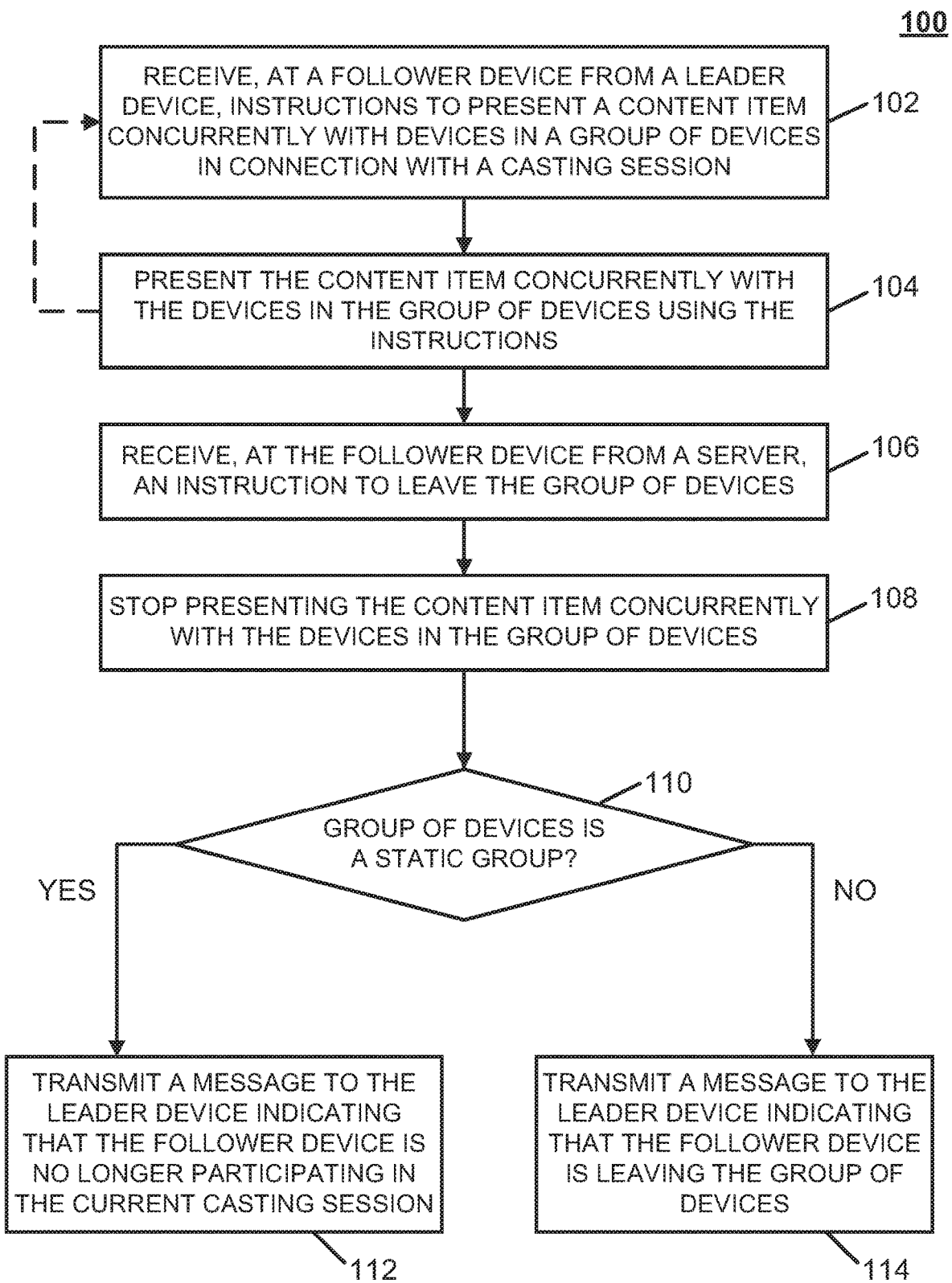
FIG. 1 shows an illustrative example of a process for removing a follower device from a group of synchronized devices in accordance with some embodiments of the disclosed subject matter.

In accordance with various embodiments, mechanisms (which can include methods, systems, and media) for providing dynamic media sessions are provided.

In some embodiments, the mechanisms described herein can be used to provide dynamic media sessions in which devices can be added or removed from a group of devices that are being used to synchronously present media content. For example, in some embodiments, a group of devices (e.g., a display device, an audio device, and/or any other suitable type of media playback device(s)) can be grouped such that each device in the group of devices plays a media content item or a collection of media content items (e.g., a playlist of content items, and/or any other suitable type of collection of media content items) in a group media playback session. For example, in some embodiments, the group of devices can synchronously present music, a video, a television program, a radio program, a podcast, and/or any other suitable type of media content. In some such embodiments, a first device in the group of devices can be designated as a leader device of the group of devices, and the other devices in the group of devices can be designated as follower devices in the group of devices. Note that, in some embodiments, the leader device can perform any suitable function(s), such as transmitting instructions to the follower devices to begin playback of a media content item, transmitting instructions to the follower devices to modify playback of a currently playing media content item in any suitable manner, transmitting a stream of content that corresponds to the media content item, transmitting a link to the media content item, and/or perform any other suitable functions.

In some embodiments, the mechanisms described herein can be used by a device within a group of devices to be removed from a group of devices that are synchronously presenting media content in a group media playback session.

For example, in an instance in which a device is a follower device in a group of devices, the mechanisms described herein can allow the follower device to remove itself from a group of devices presenting the media content using the techniques shown in and described above in connection with FIG. 1. As a more particular example, in some embodiments, the mechanisms described herein can allow the follower device to receive an indication that the follower device is to stop presenting the media content and, in response or receiving the indication, transmit a message to the leader device of the group of devices that the follower device is no longer participating in synchronous playback of the media content.

As another example, in an instance in which a device is a leader device in a group of devices, the mechanisms described herein can allow the leader device to stop presenting the media content on the leader device while continuing to serve as the leader device for the group of devices, such that the follower devices in the group of devices continue synchronous playback of the media content. As a more particular example, in some embodiments, as shown in and described below in connection with FIG. 2, the leader device can continue transmitting instructions to follower devices in the group of devices that include any suitable information that allows the follower devices to continue synchronously presenting the media content while the leader device is itself inhibited from presenting the media content (e.g., timestamps indicating playback positions of the media content, and/or any other suitable information). As another more particular example, in some embodiments, in response to receiving a request to stop playback of media content on a leader device or otherwise be removed from the group of devices and in response to determining that the leader device is to remain the leader device for the group of devices, the mechanisms can cause the leader device to stop local playback of the media content on the leader device by releasing one or more media resources used by a media playback application executing on the leader device and can cause the media playback application to execute on the leader device as a hidden media playback application, where the hidden media playback application can continue to transmit control instructions to the follower devices for synchronously presenting the media content.

Additionally, in some embodiments, the mechanisms described herein can allow a leader device to initiate a subsequent media playback session. This can include, for example, playing back another media content item on the leader device, casting another media content item to a follower device, casting another media content item to another group of devices, etc.

For example, in some embodiments, the mechanisms described herein can allow a leader device to launch a second instance of the media playback application for presenting media content on the leader device and/or one or more follower devices (e.g., in a visible state) while concurrently executing the first instance of the media playback application for transmitting control instructions to the follower devices for synchronously presenting the media content in a previous group media playback session (e.g., in a hidden state).

In another example, in some embodiments, the mechanisms described herein can allow a leader device to be a leader device of two groups of devices. For example, as described above and as shown in and described below in connection with block 210 of FIG. 2, the leader device can be a leader device of a first group of devices including one or more follower devices that are synchronously presenting a first media content item while the leader device is halted from presenting the first media content item. Continuing with this example, in some embodiments, the leader device can also be a leader device of a second group of devices including one or more follower devices that are synchronously presenting a second media content item, where the leader device is also synchronously presenting the second media content item along with the follower devices in the second group of devices, as described below in connection with block 216 of FIG. 2.

In some embodiments, a group of devices that is synchronously presenting media content can include any suitable number of devices (e.g., two, three, five, and/or any other suitable number) of media playback devices of any suitable type(s) (e.g., audio devices, assistant devices having audio and/or video capabilities, speakers, display devices, televisions, game consoles, etc.). In some embodiments, the group of devices can be configured in any suitable manner. For example, in some embodiments, a group of devices can be configured via a user interface presented on a user device of a user (e.g., on a mobile phone, on a tablet computer, on a wearable computer, on a laptop computer, on a desktop computer, and/or any other suitable device). As described above, in some embodiments, a group of devices can have a leader device. In some embodiments, the leader device can be any suitable device that is included in the group of devices, such as a particular speaker or set of speakers, a particular television, a particular virtual assistant device, and/or any other suitable device. In some embodiments, the remainder of the group of devices can include any suitable number of follower devices. In some embodiments, as described below, the leader device can transmit any suitable instructions to follower devices in the group of devices that cause the devices in the group of devices to concurrently present the media content item.

Note that, in some embodiments, the group of devices can be a static group or a dynamic group. In some embodiments, a static group of devices, as generally referred to herein, can be a group of devices that are configured as a group and stored as a group of devices (e.g., a "living room and kitchen" group, an "upstairs bedroom" group, a "speakers for watching movies" group, and/or any other suitable group), in particular a group configured before a time a media content item is cast or before a presentation of a casted media content item. In some embodiments, a user of the user device can then cast a media content item (e.g., a video, an audio content item, a playlist of content items, and/or any other suitable type of media content item) to the static group, which can cause the casted media content item(s) to begin being synchronously presented by each device in the group of devices. In some embodiments, a dynamic group of devices, as generally referred to herein, can be a group of devices that is created at a time a media content item is cast or during presentation of a casted media content item. For example, in some embodiments, a media content item can be cast to a first device (e.g., a speaker) via a mobile device or a virtual assistant device, and a dynamic group can be created when a second device (e.g., a second speaker, a television, etc.) is added to a group to begin synchronously presenting the media content item with the first device.

Note that, in some embodiments, as shown in and described below in connection with FIG. 2, a leader device can transmit instructions to follower devices participating in a group media playback session that cause the follower devices to synchronously present media content items without the leader device presenting the media content items itself. That is, in some embodiments, the mechanisms described herein can allow the leader device to remain in a group of devices participating in a group media playback session while not presenting content associated with the group media playback session. Alternatively, in some embodiments, the mechanisms described herein can be used to remove a leader device from a group of devices associated with a media playback session. In some such embodiments, a stream of content associated with media content being presented in a group media playback session can be transferred from a leader device to a different device that is designated as an updated leader of the group media playback session. For example, in some embodiments, the updated leader of the group media playback session can be a follower device that is currently included in the group media playback session, as shown in and described below in connection with FIG. 3. Additionally or alternatively, in some embodiments, the updated leader of the group media playback session can be a new device that is added to the group media playback session, as shown in and described below in connection with FIG. 4.

In some embodiments, a stream transfer can be implemented in any suitable manner. For example, as shown in and described below in connection with FIG. 3, in some embodiments, a current leader device can transmit instructions to a follower device currently in a group media playback session that cause the follower device to become an updated leader device. As another example, as shown in and described below in connection with FIG. 4, in some embodiments, a stream transfer can be implemented using a server associated with a content casting service. As a more particular example, in some embodiments, information associated with the group media playback session that is stored and maintained by the server can be updated to indicate an updated leader device, and the server can then cause the stream of content corresponding to content items being presented in the group media playback session to be transferred to the updated leader device in connection with instructions that cause the updated leader device to transmit instructions to follower devices participating in the group media playback session (e.g., instructions that cause the follower devices to synchronously presented the content items). In some such embodiments, the leader device can then be removed from the group of devices participating in the group media playback session. In some embodiments, a leader device that is removed from the group of devices can then be powered off or disconnected from a communication network without disrupting the group media playback session.

Additionally, note that, in some embodiments (e.g., as shown in and described below in connection with FIG. 2), instructions can be transmitted to a device from a server, such as a server associated with a content casting service. In some embodiments, the server can store any suitable information, such as information associated with groups of devices that can be controlled to synchronously present media content. For example, in some embodiments, the server can store and maintain information that indicates identifiers of different devices assigned to a group of devices. As a more particular example, in some embodiments, the server can store information that indicates identifiers of multiple different devices (e.g., a living room speaker, a kitchen speaker, etc.) as well as an identifier of a group that the multiple different devices are assigned to (e.g., "living room and kitchen," and/or any other suitable group). In some embodiments, the server can transmit remote casting commands to different devices using the stored information, as described below in more detail in connection with FIG. 2. In some embodiments, the server can store the information in any suitable manner, such as in a graph format that shows connections or groupings between different devices.

These and other features for providing dynamic media sessions are described further in connection with FIGS. 1-6.

Turning to FIG. 1, an illustrative example 100 of a process for removing a follower device from a group of synchronized devices is shown in accordance with some embodiments of the disclosed subject matter. In some embodiments, blocks of process 100 can be executed by a follower device (e.g., a speaker, a television, a game console, etc.) that is participating in a group of devices that are to concurrently present a media content item.

In some embodiments, the follower device can, at 102 of process 100, receive, from a leader device, instructions to present a content item concurrently with devices in a group of devices in connection with a cast session. In some embodiments, the instructions can include any suitable information or other content. For example, in some embodiments, the instructions can include a link indicating a location of the media content item to be presented (e.g., a Uniform Resource Locator (URL), and/or any other suitable type of link). As another example, in some embodiments, the instructions can include a stream of content corresponding to the content item. As yet another example, in some embodiments, the instructions can include a delay until playback of the media content item is to begin, thereby allowing the devices in the group of devices, including the follower device executing process 100, to present the media content item synchronously.

Note that, in some embodiments, information associated with the cast session can be stored on a server, such as a server associated with a content casting service. For example, in some embodiments, an identifier associated with the cast session, identifiers of devices included in the group of devices, and/or an identifier of a leader device of the group of devices can be stored on the server.

In some embodiments, the follower device can present the content item concurrently with the devices in the group of devices at 104 of process 100. In some embodiments, the content item can be presented concurrently by the devices in the group of devices in any suitable manner. For example, in instances in which the content item includes video content and audio content, the video content can be presented by a device in the group of devices that is capable of presenting video content, and the audio content can be presented by any of the devices in the group of devices that are capable of presenting audio content, which can, in some embodiments, include the device presenting the video content. In some embodiments, synchrony of playback of the content item by the devices in the group of devices can be maintained in any suitable manner. For example, in some embodiments, the leader device can transmit any suitable timestamps (e.g., an audio timestamp, a video timestamp, and/or any other suitable timestamps) to the follower devices at any suitable frequency (e.g., every five seconds, every ten seconds, and/or any other suitable frequency). In some embodiments, the follower devices can then use the received timestamps to change a playback position to a playback position corresponding to a received timestamp, thereby maintaining synchronized playback across the devices in the group of devices.

In some embodiments, process 100 can loop back to 102, where the follower device can receive additional instructions from the leader device. For example, in some embodiments, as described above, the follower device can receive additional instructions that include an updated timestamp corresponding to an updated playback position of the content item. In some embodiments, the follower device can then use the additional instructions to continue presentation of the content item concurrently with the other devices in the group of devices. For example, in some embodiments, the follower device can adjust a current playback position of the content item on the follower device executing process 100 to an updated playback position corresponding to the additional instructions to maintain synchrony of playback of the content item with the other devices in the group of devices.

In some embodiments, the follower device can receive an instruction for the follower device to leave the group of devices at 106 of process 100. In some embodiments, the instruction can be received via a server that has stored an identifier of the current cast session and/or any other suitable information associated with the current cast session (e.g., identifiers of the devices in the group of devices, an identifier of the leader device of the group of devices, and/or any other suitable information), such as the server associated with the content casting service, as described above. Note that, in some embodiments, the server can receive an indication that the follower device is to be removed from the group of devices in any suitable manner. For example, in some embodiments, the server can receive the indication that the follower device is to be removed from the group of devices via a message transmitted from a user device of a user (e.g., from a mobile phone, from a tablet computer, from a wearable computer, from a virtual assistant device, and/or any other suitable type of user device). As a more particular example, the server can receive an indication that a specific follower device (e.g., "living room speakers," "kitchen speakers," and/or any other suitable device) that can be identified in any suitable manner, such as by a location of the device (e.g., "living room," "kitchen," and/or any other suitable location), by a name assigned to the follower device, and/or in any other suitable manner. In some such embodiments, the server can then identify the specified follower device from information stored on the server, and can transmit the instruction to the follower device to leave the group of devices.

In some embodiments, the follower device can stop presenting the content item concurrently with the devices in the group of devices in response to receiving the instruction at 108 of process 100.

In some embodiments, the follower device can determine whether the group of devices is a static group at 110 of process 100. As described above, in some embodiments, a static group can refer to a group of devices configured and saved prior to initiating the cast session or any other suitable group media playback session. Note that, in some embodiments, in response to determining that the group of devices is not a static group, the follower device can determine that the group of devices is a dynamic group. In some such embodiments, as described above, a dynamic group can be a group that was configured during the cast session and/or at a beginning of the cast session.

In some embodiments, the follower device can determine whether the group of devices is a static group in any suitable manner. For example, in some embodiments, the follower device can determine whether the group of devices is a static group based on information stored in association with the configured group of devices that indicates a group type (e.g., a static group or a dynamic group). As another example, in some embodiments, the follower device can compare a date and/or a time the group was configured with a time the cast session was initiated. As a more particular example, in an instance in which the follower device determines that the group was configured and saved prior to a time the cast session was initiated, the follower device can determine that the group of devices is a static group.

If, at 110 of process 100, the follower device determines that the group is a static group ("yes" at 110), the follower device can proceed to 112 of process 100 and can transmit a message to the leader device indicating that the follower device executing process 100 is no longer participating in the current cast session. In some embodiments, in response to receiving the message, the leader device can stop transmitting instructions to the follower device executing process 100 that cause the follower device to present the content item concurrently with the devices in the group of devices.

Note that, in some embodiments, the follower device executing process 100 can remain in the group of devices. In particular, by remaining in the group of devices, the follower device can receive future instructions to begin presenting a content item in connection with a future cast session. For example, once the cast session or the group media playback session ends and the group of devices participating in the current session is unlaunched, the leader device can clear state information indicating whether one or more follower devices have been dynamically removed and, in a subsequent cast session, can begin media playback (e.g., by providing an audio stream and corresponding control instructions) to the follower devices in a static group of devices.

Conversely, if, at 110 of process 100, the follower device determines that the group is not a static group ("no" at 110), the follower device can proceed to 112 and can transmit a message to the leader device indicating that the follower device executing process 100 is leaving the group of devices. In some embodiments, to rejoin the group of devices, the follower device executing process 100 can be dynamically added back, at any suitable time, to the group of devices by transmitting a request to be added to the group of devices.

Figure 2:
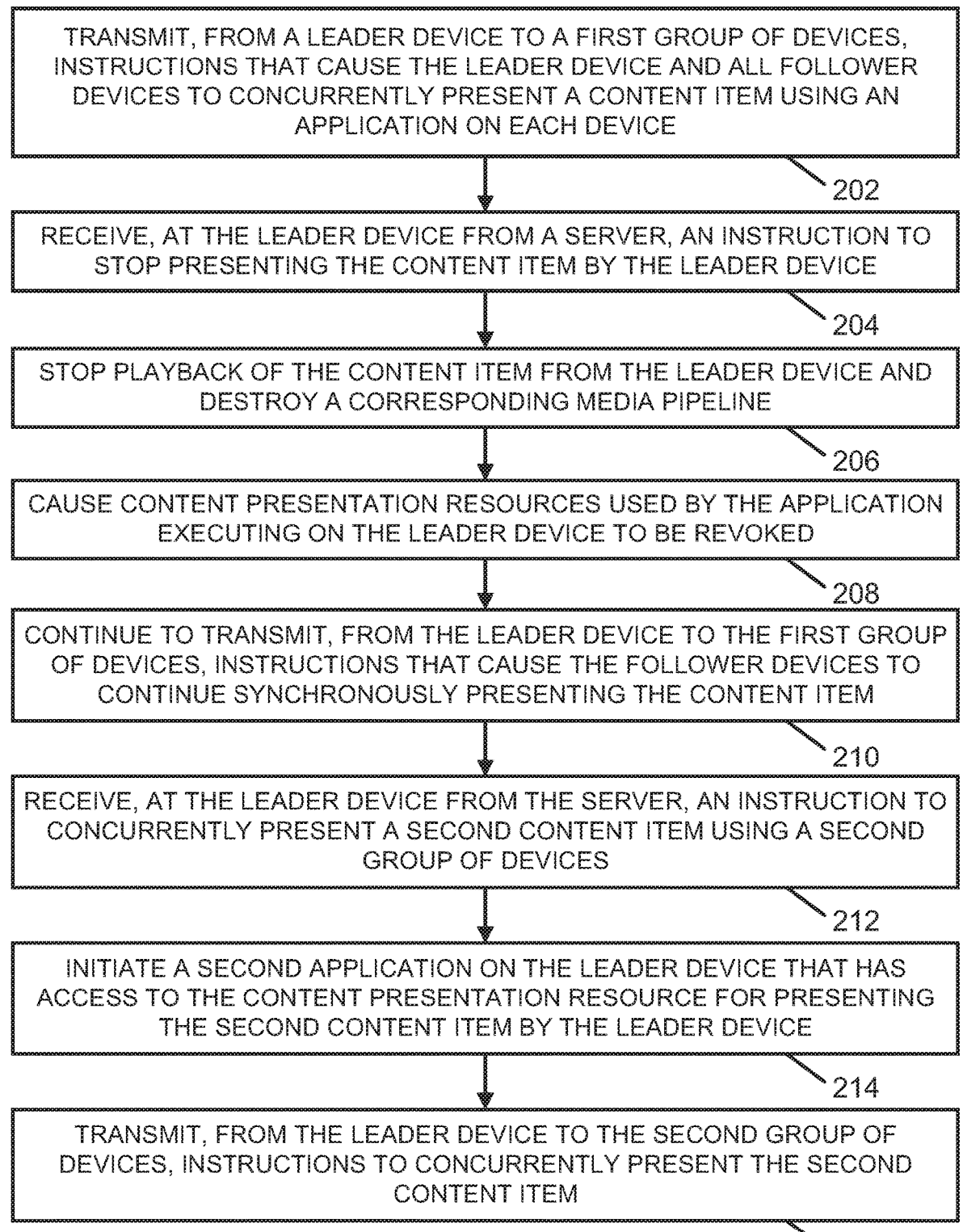
FIG. 2 shows an illustrative example of a process for inhibiting participation of a leader device in a group media playback session in accordance with some embodiments of the disclosed subject matter.

Turning to FIG. 2, an illustrative example 200 of a process for inhibiting participation of a leader device in a group media playback session is shown in accordance with some embodiments of the disclosed subject matter. In some embodiments, blocks of process 200 can be executed on any suitable device, such as a leader device of a group of devices. Note that, in some embodiments, the leader device can be identified from the group of devices in any suitable manner. For example, in some embodiments, the leader device can be specified by a user who configured the group of devices (e.g., via a user interface, and/or in any other suitable manner). As another example, in some embodiments, the leader device can be dynamically selected from devices in the group of devices based on any suitable information, such as device capabilities of the leader device in relation to the content item that is to be presented (e.g., selecting a display device with an associated display in response to determining that the content item includes video content, etc.), a leader priority score (e.g., as described below in connection with block 216 of FIG. 2), and/or based on any other suitable information.

In some embodiments, the leader device can transmit, to one or more follower devices that each belong to a first group of devices, instructions that cause the leader device and each of the follower devices to concurrently present a content item in connection with a cast session or other suitable group media playback session at 202 of process 200. As described above in connection with FIG. 1, in some embodiments, the content item can be any suitable type of content item, such as a content item that includes video content and audio content (e.g., a video, a movie, a television program, live-streamed video content, and/or any other suitable type of content item), only audio content (e.g., music, a radio program, an audio podcast, a song, a playlist of songs, and/or any other suitable type of audio content item(s)), and/or any other suitable type of content. Note that, in some embodiments, in instances in which the content item includes video content, the leader device can instruct a follower device that has video display capabilities to present the video content associated with the content item, and can instruct other devices in the group of devices to present the audio content associated with the content item. Additionally or alternatively, in instances in which the content item includes video content, the leader device itself can present video content and/or audio content associated with the content item.

In some embodiments, the leader device can cause any suitable instructions to be transmitted to devices in the first group of devices. For example, in some embodiments, the instructions can include a link to the content item that is to be presented. As another example, in some embodiments, the instructions can include one or more timestamps (e.g., an audio timestamp indicating a playback position in the audio content, a video timestamp indicating a playback position in video content of the content item, and/or any other suitable timestamps) that can be used by each of the follower devices in the first group of devices to maintain synchrony while presenting the content item. As yet another example, in some embodiments, the leader device can stream data associated with the content item to the one or more follower devices in the first group of devices. As a further example, in some embodiments, the instructions can include start of media stream commands, pause/resume commands (which can include the leader device's timestamp at which to pause or resume), end of media stream command (which can include a sequence number and a timestamp of a final media data frame), and/or volume control commands for the group media playback session.

Note that, in some embodiments, the leader device can present the content item using any suitable applications executing on the leader device. For example, in some embodiments, audio content associated with the content item can be presented using an audio application executing on the leader device. As another example, in some embodiments, video content associated with the content item can be presented on a display associated with the leader device using a video application associated with the leader device. Additionally or alternatively, in some embodiments, the leader device can transmit instructions to follower devices in the first group of devices using the one or more applications executing on the leader device. For example, in some embodiments, audio timestamps that are used by the follower devices to synchronously present audio content associated with the content item can be determined and/or transmitted using the audio application executing on the leader device.

Additionally, note that, as described above in connection with FIG. 1, in some embodiments, any suitable information associated with the cast session can be stored by a server. For example, in some embodiments, an identifier of the cast session, a date and/or a time the cast session was initiated, identifiers of devices in the first group of devices, an identifier of the leader device, and/or any other suitable information can be stored by the server.

In some embodiments, the leader device can receive an instruction for the leader device to stop playback of the content item in connection with the cast session at 204 of process 200. In some embodiments, a server can receive an indication that the leader device is to stop presenting the content item in any suitable manner. For example, in some embodiments, the server can receive a request from a user device that indicates that a particular device (e.g., the leader device) is to stop presenting the content item. As a more particular example, in some embodiments, the server can receive a request from the user device that indicates the particular device that is to stop presenting the content item in connection with the cast session in any suitable manner, such as by a name or other identifier assigned to the particular device (e.g., "living room speakers," "bedroom television," etc.), and/or in any other suitable manner, and the server can then determine that the identified device is the leader device of the group of devices. Note that, in some embodiments, the user device that transmits the request to the server can be any suitable user device, such as a mobile phone, a tablet computer, a wearable computer, a laptop computer, a virtual assistant device, and/or any other suitable type of user device. Additionally, note that, in some embodiments, the user device can receive the request from a user of the user device in any suitable manner, such as via a user interface presenting on the user device, via a spoken command received by a microphone of the user device, and/or in any other suitable manner.

In some embodiments, the leader device can halt playback of the content item from the leader device in any suitable manner at 206 of process 200. For example, in some embodiments, the leader device can transmit instructions to a media playback pipeline associated with the leader device that indicates that playback of the content item is to be stopped. Additionally or alternatively, the leader device can, in some embodiments, remove a corresponding media pipeline backend in any suitable manner.

In some embodiments, the leader device can cause content presentation resources used by the application executing on the leader device to be released or otherwise revoked at 208 of process 200. In some embodiments, the content presentation resources can include any suitable type(s) of resources available for use by the leader device to present media content. For example, in some embodiments, the content presentation resources can include audio resources for presenting audio content using the leader device. As another example, in some embodiments, the content presentation resources can include screen resources for presenting video content associated with the content item and/or for presenting a user interface associated with the application for presenting the content item.

In some embodiments, the leader device can cause the content presentation resources used by the application executing on the leader device to be revoked in any suitable manner. For example, in some embodiments, an application manager that manages applications executing on the leader device can revoke a particular resource used by the application for presenting the content item by the leader device. As a more particular example, in an instance where the application is an audio application for presenting audio content associated with the content item, the application manager can revoke an audio resource used by the application. As another more particular example, in an instance where the application is an audio application and where the audio application includes a user interface that is presented on a display of the leader device (e.g., for adjusting volume of the audio content presented by the leader device, for receiving playback position changes associated with playback of the content item, and/or any other suitable type of user interface), the application manager can revoke a screen resource used by the application. As yet another more particular example, in an instance where the application is a video application for presenting video content associated with the content item, the application manager can revoke a screen resource used by the video application. Note that, in some embodiments, multiple applications can be used by the leader device for playback of the content item. For example, in some embodiments, the leader device can use an audio application for presenting audio content associated with the content item and a video application for presenting video content associated with the content item. In some such embodiments, the application manager can revoke any corresponding resources associated with the multiple applications.

Note that, in some embodiments, the application manager can cause the application to be hidden such that the application is no longer visible (i.e., on a screen of the leader device and thus, not using screen resources). In some embodiments, an application that is transitioned to a hidden state or made invisible can be inhibited from being considered a current application. It should also be noted that, in some embodiments, the leader device can support the concurrent execution of multiple media playback application using one or more layers. These layers can include, for example, a layer for a cast application that is visible to a user of the leader device, a layer for an overlay application that can be shown on top of the cast application, and a layer for a hidden application that can be executed when another application (e.g., a remote-control application) is the visible application.

In some embodiments, a current application can receive any suitable media-control messages via any suitable input controller, such as a mobile device that is paired with the leader device, a remote control, and/or any other suitable type of device. In some embodiments, a current application can receive media-control messages in any suitable manner, such as via a handler for a remote control device or application that listens for messages intended for a current application. In some embodiments, a particular application can be indicated as a current application by an application manager of the leader device, which can cause a handler for a remote control device or application to transmit messages to an application indicated by the application manager as the current application.

Additionally, note that, as described above, in some embodiments, the application used by the leader device for presenting the media content item can be marked as hidden, and therefore, not the current application. Accordingly, the application, even when used to cause the media content item to be presented by the follower devices in the first group of devices, can be inhibited from receiving media-control messages via a remote control device or other device, because the application is not indicated as the current application. However, in some embodiments, media-control messages to control playback of the content item on the follower devices in the first group of devices can be passed to a hidden application instance executing on the leader device in any suitable manner. For example, in some embodiments, the leader device can receive in any suitable manner an instruction that identifies the first group of devices and that includes a modification of playback of the content item being presented synchronously by the first group of devices (e.g., from a mobile device paired with the leader device, from a virtual assistant device paired with the leader device, and/or in any other suitable manner). Continuing with this example, in some embodiments, the leader device can then identify a hidden application associated with synchronous playback of the content item by the first group of devices and can transmit the received instruction to the hidden application. In some such embodiments, the hidden application can then cause instructions to be transmitted to the first group of devices that causes the first group of devices to modify presentation of the content item. For example, in an instance in which the leader device is a television display device, and in which the first group of follower devices include a pair of audio devices, the television display device can transmit, using a hidden audio application, instructions to the pair of audio devices that cause the audio device to modify the playback of the content item.

In some embodiments, the leader device can determine whether the application (e.g., the media playback application, the cast application, etc.) that was used by the leader device to present the content item is to be terminated based on any suitable information. For example, in an instance in which the application is an audio application that is used by the leader device to both present audio content on the leader device and transmit any suitable audio information to follower devices in the first group of devices using an audio pipeline backend, the leader device can determine that the application is to remain active, but in a hidden state (e.g., in a layer executing a hidden application that is no longer visible to a user of the leader device). As another example, in an instance in which the leader device is using the application to present content locally but is not causing content to be presented by the follower devices in the group of devices, the leader device can determine that the application is to be terminated.

Note that, in some embodiments, in instances in which the leader device is the only device presenting video content associated with the content item, a device from the first group of devices can be selected to begin selecting the video content synchronously with the audio content associated with the content item that is being presented by the follower device in the first group of devices. In some embodiments, the device can be selected in any suitable manner, for example, based on a capability of the device to display video content, based on processing and/or memory resources of the device, based on a screen resolution or display size of the device, and/or based on any other suitable information.

In some embodiments, the leader device can additionally notify a resource manager associated with the leader device that the content presentation resource has been revoked. For example, in some embodiments, the application used by the leader device for presenting the content item can transmit a message to the resource manager indicating that the content presentation resource has been released by the application. As another example, in some embodiments, the application manager associated with the leader device can transmit a message to the resource manager indicating that the content presentation resource has been released by the application.

In some embodiments, the leader device can continue transmitting, from the leader device to the follower devices in the first group of devices, instructions that cause the follower devices to continue presenting the content item at 210 of process 200. Note that the leader device can transmit instructions that cause the follower devices to continue presenting the content item while the leader device is halted from presenting the content item. In some embodiments, the leader device can transmit any suitable instructions to the follower devices in the first group of devices to allow the follower devices to maintain synchrony of presentation of the content item. For example, in some embodiments, the leader device can calculate any suitable timestamps for playback of the content item (e.g., audio timestamps, video timestamps, and/or any other suitable timestamps), and can transmit the timestamps to each of the follower devices. In some embodiments, the instructions transmitted to the follower devices can cause the follower devices to change a playback position of the content item to a playback position indicated by the received timestamp.

In some embodiments, the leader device can initiate another media playback session. This can include, for example, playing back another media content item on the leader device, casting another media content item to a follower device, casting another media content item to another group of devices that include the leader device and one or more follower devices, etc. In a more particular example, in some embodiments, the leader device can launch a second instance of the media playback application for presenting media content on the leader device and/or one or more follower devices (e.g., in a visible state) while concurrently executing the first instance of the media playback application for transmitting control instructions to the follower devices for synchronously presenting the media content in a previous group media playback session (e.g., in a layer executing a hidden instance of the media playback application).

In some embodiments, the leader device can receive, at the leader device from the server, an instruction to concurrently present a second content item with follower devices included in a second group of devices at 212 of process 200. That is, in some embodiments, the received instruction can indicate that the leader device is to serve as the leader device for the second group of devices while concurrently presenting the second content item in synchrony with the follower devices in the second group of devices. In some embodiments, the instruction can include any suitable information, such as an identifier associated with the second group of devices, an indication of the devices in the second group of devices, an identifier of the second content item, and/or any other suitable information. In some embodiments, devices in the second group of devices can be identified in any suitable manner, such as using an identifier associated with each device, a name assigned to each device, and/or any other suitable identifier. In some embodiments, the second content item can be identified in any suitable manner, for example, using a URL that indicates a location at which the second content item is located.

Note that, in some embodiments, the leader device can continue serving as the leader of the first group of devices that are continuing the present the first content item while the leader device is halted from presenting the first content item (e.g., as described above in connection with block 210) and additionally serving as the leader device for the second group of devices while synchronously presenting the second content item on the leader device and on the follower devices in the second group of devices.

In some embodiments, the leader device can initiate a second application on the leader device that has access to the content presentation resource at 214 of process 200, where the second application is used by the leader device to present the second content item. Note that, in some embodiments, the second application can be a second instance of the application that was used by the leader device to present the first content item, as described above in connection with block 202. In some embodiments, the second application can be any suitable application for presenting the second content item. For example, in instances in which the leader device is to present audio content associated with the second content item, the second application can be an audio application that is used to present the audio content. As another example, in instances in which the leader device is to present video content associated with the second content item, the second application can be a video application that causes the video content to be presented on a display associated with the leader device. Note that, in some embodiments, the leader device can initiate multiple applications or multiple instances of applications on the leader device that are to be used to present the second content item by the leader device. For example, in an instance in which the leader device is to present both audio content and video content associated with the second content item, the leader device can initiate an instance of an audio application for presenting the audio content associated with the second content item and an instance of a video application for presenting the video content associated with the second content item. Note that, in some embodiments, any initiated applications or instances of initiated application can be made visible. In particular, by being made visible, a visible application can be made a current application by the application manager and can therefore receive any suitable media-control messages received by a remote control handler associated with a remote control device or application, as described below in more detail.

Note that, in some embodiments, in response to being initiated, the second application can acquire any suitable content presentation resources. For example, in an instance in which the second application is an audio application that is to be used by the leader device for presenting audio content associated with the second content item, the second application can acquire audio resources. As another example, in some embodiments, the second application can acquire screen resources in response to being made visible. As yet another example, in an instance in which the second application is a video application that is to be used by the leader device for presenting video content associated with the second content item, the second application can acquire screen resources.

Additionally, note that, in some embodiments, the leader device can determine that the second application cannot be initiated based on any suitable information. For example, in some embodiments, the leader device can determine that a number of applications executing on the leader device has reached a predetermined threshold number of applications (e.g., ten applications, twenty applications, and/or any other suitable number) or has reached a predetermined threshold number of applications of a particular type (e.g., applications for presenting audio content, applications for presenting video content, and/or any other suitable type). Continuing with this example, the leader device can then determine that the second application cannot be initiated on the leader device. In some such embodiments, the leader device can cause any suitable error message to be presented via any suitable device (e.g., via a display of the leader device, via speakers associated with the leader device, via a mobile device paired with the leader device, via a virtual assistant device paired with the leader device, and/or by any other suitable device). Note that, in some embodiments, the predetermined threshold number of applications can be determined based on any suitable information, such as performance metrics of the leader device (e.g., an amount of memory available on the leader device, processor capabilities of the leader device, current CPU usage of the leader device, and/or any other suitable metrics), and/or based on any other suitable information.

In some embodiments, the leader device can transmit, from the leader device to follower devices in the second group of devices, instructions to concurrently and synchronously present the second content item at 216 of process 200. In some embodiments, the instructions can include any suitable information, such as an identifier of the second content item (e.g., a URL that indicates a location of the second content item, and/or any other suitable identifier), a stream of content corresponding to the second content item, one or more timestamps that indicates a playback position at which the follower devices are to present the second content item, and/or any other suitable information.

Note that, in response to being made visible, the second application can receive any suitable interrupts or events associated with presentation of the second content item. For example, in an instance in which a user of the leader device indicates that playback of the second content item is to be modified in any suitable manner (e.g., a volume of playback of the second content item adjusted up or down, a playback position skipped ahead or rewound, and/or modified in any other suitable manner), the second application can receive an indication of an event associated with the indicated modification of playback of the second content item using any suitable event handler(s). In some such embodiments, the second application can then modify presentation of the second content item. Additionally, in some embodiments, the leader device can additionally transmit any suitable instructions to follower devices in the second group of devices that cause the follower devices to also modify playback of the second content item. For example, in some embodiments, in instances in which the playback modification corresponds to skipping forward or backward within presentation of the second content item, the leader device can transmit updated timestamps that correspond to an updated playback position to the follower devices along with instructions to the follower devices to change a playback position using the updated timestamps. As another example, in some embodiments, in instances in which the playback modification corresponds to a volume adjustment, the leader device can transmit instructions to any suitable follower devices in the second group of devices to adjust a volume of the audio content. In some such embodiments, process 200 can select any suitable follower device to receive an instruction indicating a volume adjustment (e.g., follower devices that are presenting audio content associated with the second content item, selected follower devices that are presenting audio content associated with the second content item that have been selected based on any suitable criteria, and/or any other suitable follower devices).

Additionally, note that, in some embodiments, the leader device can continue transmitting instructions to follower devices in the first group of devices that are synchronously presenting the first content item (e.g., as described above in connection with block 210) while presenting the second content item and transmitting instructions to the follower devices in the second group of devices that are synchronously presenting the second content item (e.g., as described above in connection with block 216).

In some embodiments, a leader device can have a leader priority score. In some such embodiments, a leader device that has been removed as an active presenter of a content item (e.g., as described above in connection with blocks 204-210 of FIG. 2) can have an associated leader priority score changed in any suitable manner. For example, in some embodiments, the leader priority score can be decreased by any suitable amount. In some embodiments, the leader priority score can be used to perform any suitable function. For example, in some embodiments, a leader priority score can be used to select a particular device from a group of devices that is to act as a leader of the group of devices. As a more particular example, in an instance in which a leader device is halted from presentation of a content item but continues as a leader device of a group of devices that are presenting the content item (e.g., as described above in connection with FIGS. 204-210 of FIG. 2), a leader priority score associated with the leader device can be lowered such that the leader device is relatively less likely to be selected as a leader device for another group of devices. In some embodiments, the leader priority score can be used to conserve or manage resources on a particular device, for example, by preventing the device from being a leader device for more than a predetermined number of groups of devices.

Additionally, note that, in some embodiments, in response to a leader device receiving an instruction that the leader device is to no longer present a content item that is being synchronously presented by a group of devices (e.g., as described above in connection with block 204 of FIG. 2), any other device in the group of devices can be made the leader device of the group of devices. For example, in some embodiments, the leader device or the server can transmit instructions to a selected device in the group of devices that cause the selected device to become the leader device and therefore, to perform any suitable function(s) to maintain synchrony during presentation of the content item by the group of devices (e.g., transmitting instructions that include updated timestamps, and/or any other suitable function(s)). In some embodiments, the leader device or the server can transfer a stream of content from the leader device to a newly selected device that is to be made the leader device of the group of devices, for example, by transmitting instructions to the selected device that indicate a URL or other location of the content item and/or any other suitable information.

Figure 3:
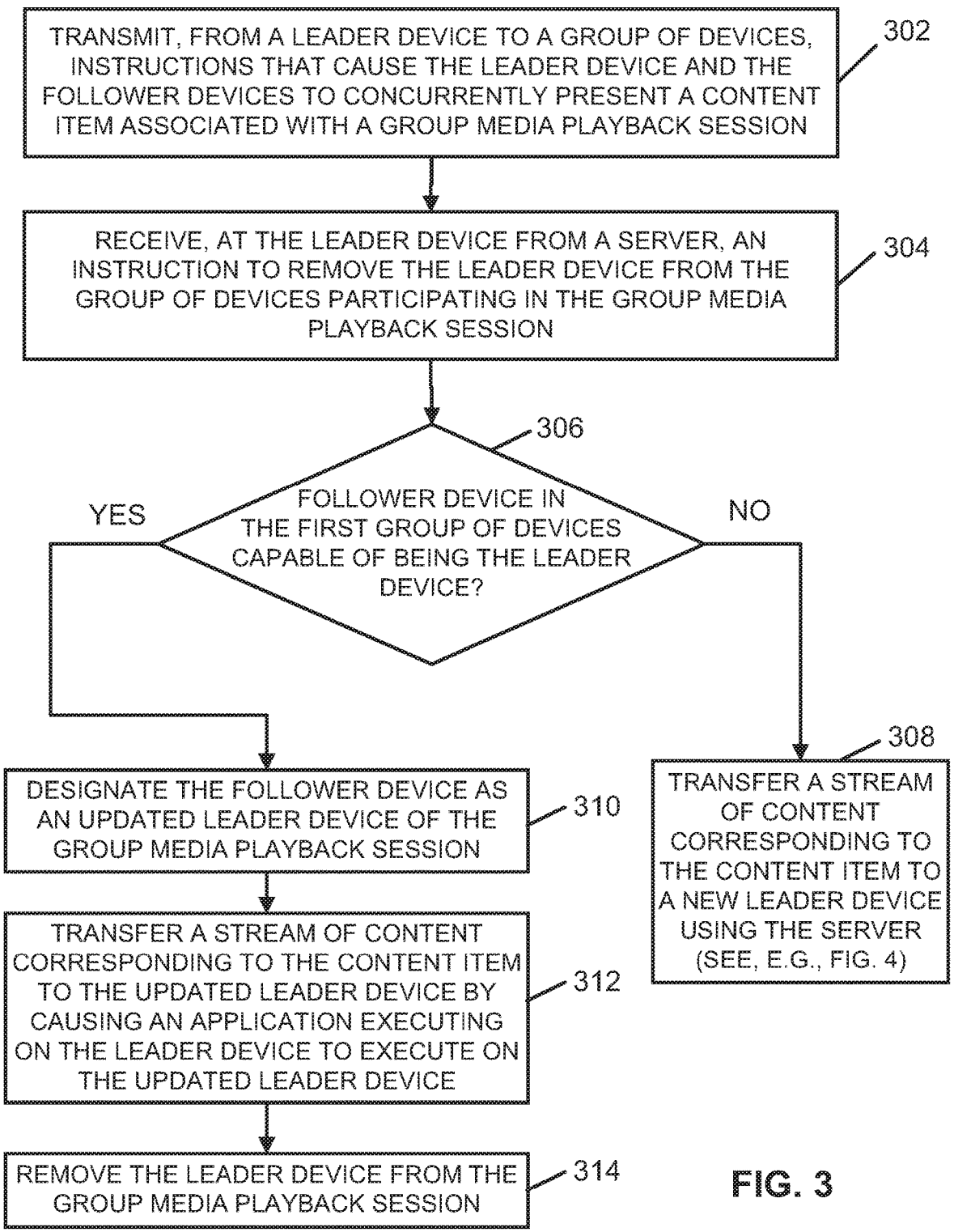
FIG. 3 shows an illustrative example of a process for transferring a stream of content from a leader device to a follower device in a group media playback session in accordance with some embodiments of the disclosed subject matter.

Turning to FIG. 3, an illustrative example 300 of a process for transferring a stream of content from a leader device to a follower device in a group media playback session is shown in accordance with some embodiments of the disclosed subject matter. Note that, in some embodiments, blocks of process 300 can be executed by a leader device of a group media playback session to synchronously present media content items.

In some embodiments, the leader device can transmit, from a leader device to a group of devices participating in a group media playback session, instructions that cause the leader device and the follower devices to concurrently and/or synchronously present a content item associated with the group media playback session at 302 of process 300. In some embodiments, the leader device can transmit the instructions from the leader device to the follower devices in any suitable manner, for example, as described above in connection with block 202 of FIG. 2.

In some embodiments, the leader device can receive, at the leader device from a server, an instruction that the leader device is to be removed from the group of devices participating in the group media playback session at 304 of process 300. In some embodiments, the leader device can receive the instruction in any suitable manner. For example, in some embodiments, the leader device can receive the instruction from a server associated with a content casting service that stores information associated with the group media playback session, as described above in connection with block 204 of FIG. 2. Note that, in some embodiments, the server can receive information indicating that the leader device is to be removed from the group of devices in any suitable manner. For example, in some embodiments, the server can receive the information from a mobile device that initiated the group media playback session by casting content to devices participating in the group media playback session (e.g., via a user interface presented on the mobile device, via a voice command received by the mobile device, and/or in any other suitable manner).

In some embodiments, the leader device can determine whether a follower device in the group of devices participating in the group media playback session is capable of being designated a leader device at 306 of process 300. Note that, in some embodiments, the leader device can iterate through the follower devices in the group of devices to identify a follower device, if any, that is capable of being a leader device of the group media playback session. In some embodiments, the leader device can determine whether a follower device in the group of devices is capable of being designated a leader device of the group media playback session in any suitable manner. For example, in some embodiments, the leader device can determine whether a particular follower device in the group of devices is capable of being a leader device of the current group media playback session based on a type of media content being presented in the group media playback session and a content presentation capability of the particular follower device. As a more particular example, in an instance in which content items presented in the group media playback session include video content, the leader device can determine that follower devices in the group of devices that are not associated with a display device capable of presenting the video content are not capable of being a leader device of the group media playback session. As another example, in some embodiments, the leader device can determine whether a particular follower device in the group of devices is capable of being a leader device of the group media playback session based on device capability information, such as a current memory usage of the follower device, whether the particular follower device is currently a leader device of a different group media playback session (e.g., as described above in connection with blocks 212-214 of FIG. 2), and/or any other suitable device capability information. As a more particular example, in some embodiments, the leader device can determine that a particular follower device that is currently a leader device of a different group media playback session is not capable of being a leader device of the current group media playback session. As another more particular example, in some embodiments, the leader device can determine whether a particular follower device is capable of being a leader device of the current group media playback session based on a priority score of the particular follower device, as described above in connection with FIG. 2. As yet another example, in some embodiments, the leader device can determine whether a particular follower device is capable of being a leader of the current group media playback session based on whether the particular follower device is capable of executing an application currently being used by the leader device to present the content item and to transmit instructions to the follower devices participating in the group media playback session. As a more particular example, in some embodiments, the leader device can determine whether the particular follower device is capable of executing the application based on any suitable information, such as a make or model of the follower device, current memory usage of the follower device, and/or any other suitable information.

If, at 306 of process 300, the leader device determines that there are no follower devices in the group of devices that are capable of being designated the leader device of the group media playback session ("no" at 306), the leader device can proceed to 308 and can cause a stream of content corresponding to the content item being presented synchronously in the group media playback session to be transferred from the leader device to a new leader device. For example, in some embodiments, the stream of content can be transferred using the techniques shown in and described below in connection with FIG. 4.

Note that, in some embodiments, the leader device can additionally determine whether a stream of content associated with the content item is to be transferred to a new leader device (including to a follower device included in the group of devices associated with the group media playback session) by the leader device or using the server associated with the group media playback session. In some embodiments, in instances in which the leader device determines that the stream of content is to be transferred by the leader device, the leader device can proceed to 310. Conversely, in instances in which the leader device determines that the stream of content is to be transferred using the server, the leader device can proceed to block 308, and the techniques shown in and described below in connection with FIG. 4 can be used to transfer the stream of content to a new leader device by the server.

If, at 306 of process 300, the leader device determines that there is a follower device in the group of devices that is capable of being designated the leader device of the group media playback session ("yes" at 306), the leader device can proceed to 310 and can designate the identified follower device as an updated leader device of the group media playback session. In some embodiments, the leader device can designate the follower device as the updated leader device in any suitable manner. For example, in some embodiments, the leader device can transmit a message to the server associated with the group media playback session that indicates an identifier of the follower device that is designated as the updated leader device. In some embodiments, the message can include any suitable information, such as a name assigned to the updated leader device, a make or model of the updated leader device, and/or any other suitable information. As another example, in some embodiments, the leader device can transmit an instruction to the identified follower device that indicates to the identified follower device that the identified follower device is now the designated updated leader device.

In some embodiments, the leader device can transfer a stream of content corresponding to the content item being presented in the group media playback session from the leader device to the updated leader device at 312 of process 300 by causing the application executing on the leader device that causes instructions to be transmitted to the follower devices in the group of devices to begin executing on the updated leader device. Note that, as described above in connection with FIG. 2, the application can be any suitable application, such as an audio application that causes audio content to be presented on the leader device and that causes instructions to be transmitted to the follower devices to synchronously present the audio content, a video application that causes audio content to be presented on the leader device and that causes instructions to be transmitted to the follower devices to synchronously present audio content associated with the video content and/or the video content, and/or any other suitable application. Additionally, note that, in some embodiments, the leader device can cause multiple applications (e.g., an audio application and a video application, and/or any other suitable combination of applications) to begin being executed on the updated leader device.

In some embodiments, the leader device can cause the updated leader device to begin executing the application(s) in any suitable manner. For example, in some embodiments, the leader device can transmit a control instruction to the updated leader device that identifies the application(s) that are to be executed on the updated leader device and that cause the updated leader device to initiate execution of the identified application(s). Note that, as described above in connection with block 208 of FIG. 2, in some embodiments, the instructions can cause the updated leader device to relinquish any resources (e.g., audio resources, screen resources, and/or any other suitable resources) currently being used by the updated leader device in order to execute the identified application. Additionally, note that, in some embodiments, the instructions can cause the identified application, or any of a group of identified application(s) to execute on the updated leader device in a visible state.

In some embodiments, in response to receiving the instructions, the updated leader device can initiate execution of the identified application(s) and can then begin transmitting control instructions to the follower devices in the group of devices participating in the group media playback session that cause the updated leader device and the follower devices to synchronously present the content item. Note that, in some embodiments, in response to determining that the updated leader device has initiated execution of the identified application(s), the leader device can stop transmitting instructions to the follower devices in the group of devices.

In some embodiments, the leader device can remove the leader device from the group media playback session at 314 of process 300. In some embodiments, the leader device can remove itself from the group media playback session in any suitable manner. For example, in some embodiments, the leader device can halt presentation of the content item. As another example, in some embodiments, the leader device can transmit a message to the server associated with the group media playback session indicating that the leader device is leaving the group of devices. Note that, in some embodiments, a leader device that is removed from a group of devices participating in a group media playback session can be powered off and/or disconnected from a communication network (e.g., a Wi-Fi network, a BLUETOOTH network, and/or any other suitable network) without disrupting presentation of the content item in the group media playback session.

Referring back to 306 of process 300, in instances in which the leader device determines that an alternative stream transfer procedure is to be executed, the leader device can proceed to 308, where the stream can be expanded to add a new device and where the original leader device can be dynamically removed from the stream.

Figure 4:
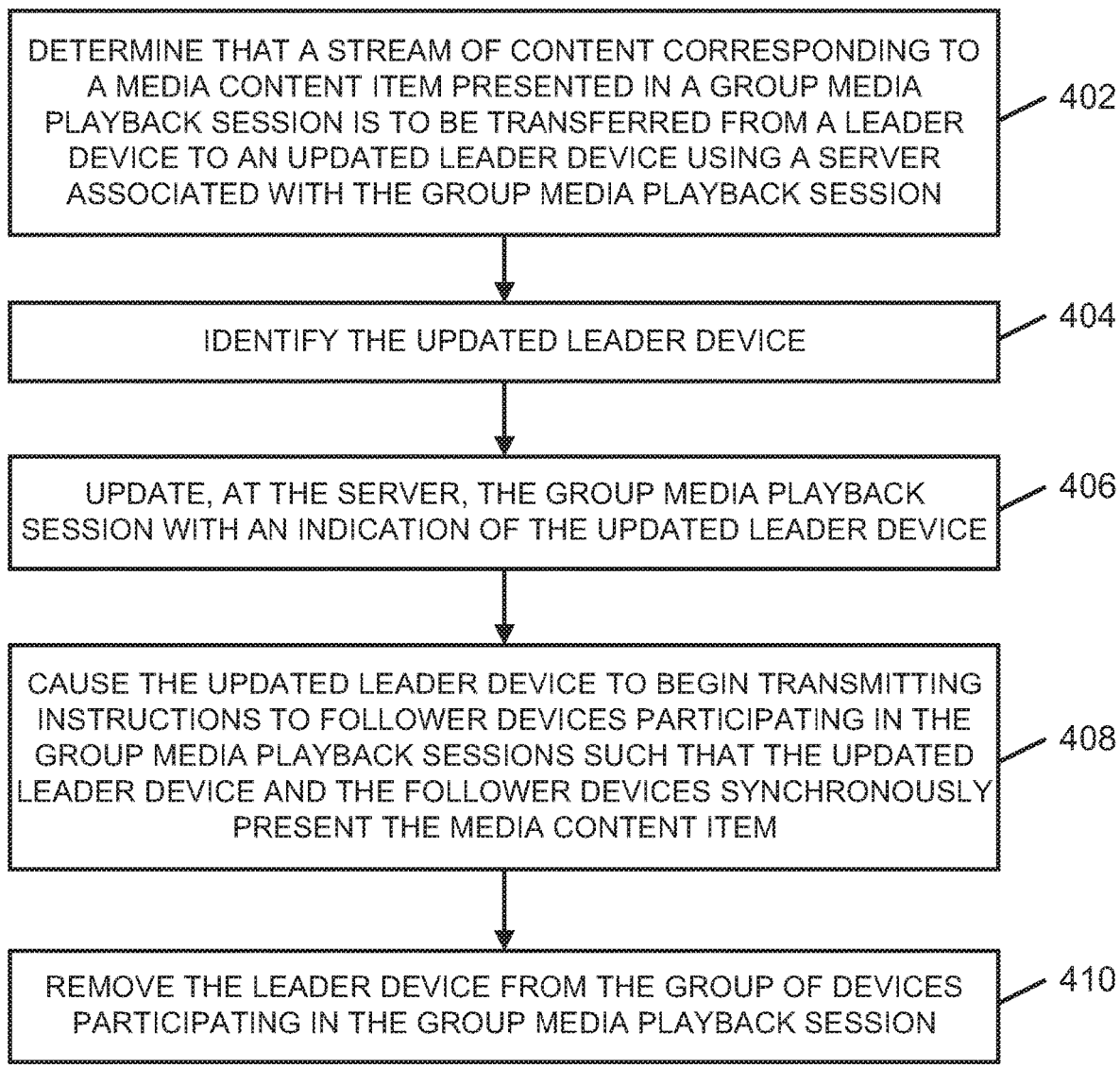
FIG. 4 shows an illustrative example of a process for transferring a stream of content from a leader device by dynamically modifying information associated with a media playback session in accordance with some embodiments of the disclosed subject matter.

Turning to FIG. 4, an illustrative example 400 of a process for transferring a stream of content from a leader device and removing the leader device from a group media playback session is shown in accordance with some embodiments of the disclosed subject matter. Note that, in some embodiments, blocks of process 400 can be executed by a server, for example, a server associated with a content casting service that stores and maintains information associated with a group media playback session.

In some embodiments, a server can determine that a stream of content corresponding to a media content item presented in a group media playback session is to be transferred from a leader device to an updated leader device at 402 of process 400. In some embodiments, the server can determine that the stream of content is to be transferred from the leader device to an updated leader device based on any suitable information. For example, in some embodiments, the server can receive an instruction from a mobile device (e.g., a mobile device that initiated the group media playback session by casting content to devices in the group media playback session, a mobile device that has authorization to modify aspects of the group media playback session, and/or any other suitable mobile device) that the leader device is to be removed from a group of devices participating in the group media playback session.

Note that, in some embodiments, a group media playback session can be associated with a virtual device stored by the server executing process 400. In some embodiments, the virtual device can correspond to the device that the group media playback session was started on. For example, in instances in which the group of devices participating in the group media playback session is a dynamic group (e.g., as described above in connection with FIG. 1), the virtual device can correspond to a first device added to or included in the group of devices. As another example, in some embodiments, the virtual device can correspond to the leader device of the group of devices participating in the group media playback session. In some embodiments, the server executing process 400 can store an identifier associated with the virtual device. In some embodiments, the server can use the virtual device to transmit instructions to devices participating in the group media playback session. For example, in some embodiments, devices participating in the group media playback session can be instructed to point at and/or connect to the virtual device, thereby allowing the devices to receive instructions associated with an identifier of the virtual device. As a more particular example, in some embodiments, follower devices in the group media playback session can receive, from the server, an identifier of the virtual device, an IP address and/or a port associated with the virtual device, and/or any other suitable information that allows the follower devices to receive instructions in association with the virtual device and/or the group media playback session corresponding to the virtual device.

In some embodiments, the server can identify an updated leader device at 404 of process 400. In some embodiments, the server can identify the updated leader device in any suitable manner. For example, in some embodiments, the server can identify a follower device in the group of devices participating in the group media playback session that is capable of being designated a leader device of the group media playback session. In some embodiments, the server can identify a follower device of the group of devices capable of being designated the leader device based on any suitable criteria. Note that, more detailed techniques for determining whether a particular follower device is capable of being designated a leader device of the group media playback session are described above in connection with block 306 of FIG. 3. In some embodiments, the server can iterate through the follower devices included in the group of devices participating in the group media playback session to identify a follower device that is capable of being designated a leader device. As another example, in some embodiments, the server can identify the updated leader device based on an instruction received from a mobile device (e.g., a mobile device that initiated the group media playback session by casting content to the devices participating in the group media playback session, and/or any other suitable mobile device).

Note that, in some embodiments, the server can identify an updated leader device that is not currently participating in the group media playback session. For example, in some embodiments, the server can identify any suitable device that is capable of participating in the group media playback session that is not currently participating in the group media playback session and that is capable of being a leader device of the group media playback session. In some embodiments, the server can identify a device that is not currently participating in the group media playback session based on any suitable information. For example, in some embodiments, the server can identify a device based on a proximity of the device to other devices participating in the group media playback session. As a more particular example, in an instance in which the devices participating in the group media playback session are all devices in a living room of a user, the server can identify an additional device that is indicated as being in the living room of the user that is not currently participating in the group media playback session.

In some embodiments, the server can update the group media playback session with an indication of the identified updated leader device at 406 of process 400. In some embodiments, the server can update the group media playback session in any suitable manner. For example, in some embodiments, the server can generate a new virtual device corresponding to the group of devices with the identified updated leader device as the leader of the group media playback session. Note that, in some embodiments, the new virtual device can be associated with an identifier that is different than the original virtual device associated with the group media playback session. In some embodiments, devices participating in the group media playback session can be instructed to reconnect to the new virtual device. For example, in some embodiments, the server can transmit, to each follower device, information indicating an identifier of the new virtual device, an IP address and/or a port associated with the new virtual device, and/or any other suitable information, thereby allowing the follower devices to receive instructions associated with the group media playback session corresponding to the new virtual device.

Note that, in some embodiments, the updated leader device can receive information indicating the new virtual device in any suitable manner. For example, in some embodiments, the server executing process 400 can broadcast a message in response to moving the media playback session to the new virtual device. In some such embodiments, the message can include an identifier of the new virtual device, information indicating the IP address and/or the port of the new virtual device, and/or any other suitable information. In some embodiments, the information indicating the IP address and/or the port of the new virtual device can be hint information that can be used by the updated leader device to connect to the new virtual device. Additionally or alternatively, in some embodiments, the server can discover the new virtual device via mDNS, and/or in any other suitable manner. Note that, in an instance in which the updated leader device is not currently receiving messages (e.g., because the updated leader device is asleep, and/or for any other suitable reason), the updated leader device can use an mDNS subtype query and/or any other suitable technique to identify information associated with the virtual device to connect to the virtual device.

In some embodiments, at 408 of process 400, the server can cause the updated leader device to begin transmitting instructions to follower devices participating in the group media playback session such that the updated leader device and the follower devices synchronously present the media content item. Note that, as described above in connection with FIG. 2, the instructions can include any suitable type of instructions, such as updated timestamps, that can be used by the follower devices to maintain synchrony during presentation of the media content item.

In some embodiments, at 410 of process 400, the server can cause the leader device to be removed from the group of devices participating in the group media playback session. In some embodiments, the server can cause the leader device to be removed from the group of devices in any suitable manner. For example, in some embodiments, the server can update information associated with the group media playback session stored on the server indicating that the leader device is no longer included in the group. Note that, in some embodiments, in response to being removed from the group of devices participating in the group media playback session, the server can remove association of the leader device with the virtual device associated with the media playback session such that the leader device is inhibited from receiving any instructions associated with the group media playback session.

Figure 5:
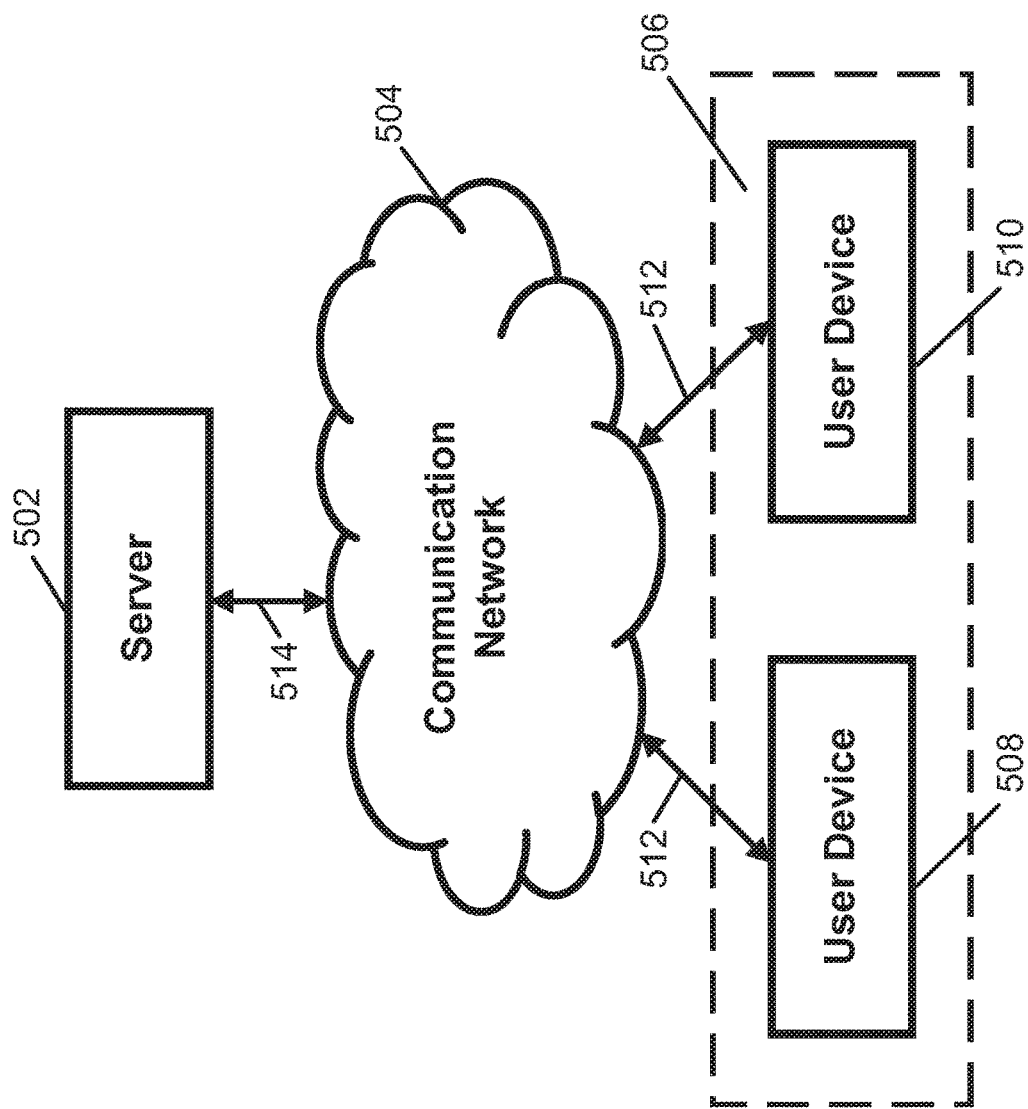
FIG. 5 shows a schematic diagram of an illustrative system suitable for implementation of mechanisms described herein for managing groups of media playback devices in accordance with some embodiments of the disclosed subject matter.
Figure 6:
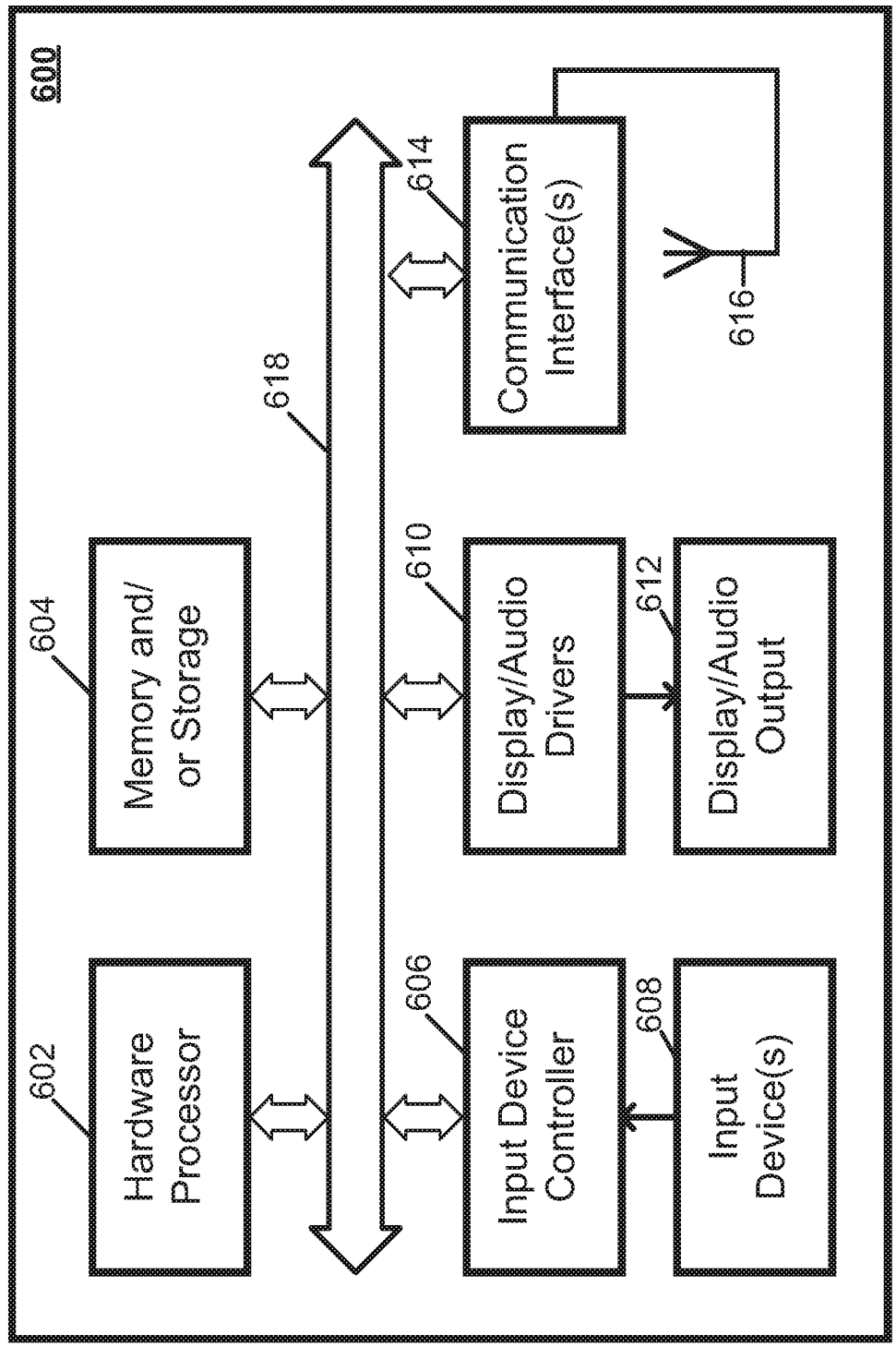
FIG. 6 shows a detailed example of hardware that can be used in a server and/or a user device of FIG. 5 in accordance with some embodiments of the disclosed subject matter.

Turning to FIG. 5, an illustrative example 500 of hardware for providing dynamic media sessions that can be used in accordance with some embodiments of the disclosed subject matter is shown. As illustrated, hardware 500 can include a server 502, a communication network 504, and/or one or more user devices 506, such as user devices 508 and 510.

Server 502 can be any suitable server(s) for storing information, data, and/or media content. For example, in some embodiments, server 502 can be associated with a content casting service for storing information associated with any suitable cast sessions and/or any suitable devices grouped together in a cast session. In some such embodiments, server 502 can transmit instructions to a media playback device of a group of media playback devices that are concurrently presenting a media content item, where the instructions can cause the media playback device to leave the group in any suitable manner, as described above in connection with FIGS. 1 and 2. As another example, in some embodiments, server 502 can store media content items, which can be transmitted to user devices 506 for presentation. In some such embodiments, the media content items can include any suitable types of media content, such as videos, movies, television programs, live-streamed content, audio content (e.g., music, audiobooks, radio programs, and/or any other suitable audio content), and/or any other suitable type of media content.

Communication network 504 can be any suitable combination of one or more wired and/or wireless networks in some embodiments. For example, communication network 504 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 506 can be connected by one or more communications links (e.g., communications links 512) to communication network 504 that can be linked via one or more communications links (e.g., communications links 514) to server 502. The communications links can be any communications links suitable for communicating data among user devices 506 and server 502 such as network links, dial-up links, wireless links, hard-wired links, any other suitable communications links, or any suitable combination of such links.

User devices 506 can include any one or more user devices suitable for presenting video content and/or audio content. For example, in some embodiments, user devices 506 can include speakers, a television, a media player, a game console, a mobile phone, a tablet computer, a desktop computer, a vehicle entertainment system, a wearable computer, and/or any other suitable type of user device.

In some embodiments, user device 506, such as a media presentation device or a media receiver device, can determine, via device discovery requests, that user devices 506 are multiple speakers within a particular proximity of user device 506 that have desirable audio playback capabilities in comparison with user device 506 having desirable video playback capabilities (e.g., a display having a particular resolution, a display having particular dimensions, etc.) and undesirable audio playback capabilities.

Note that, in some embodiments, a particular user device of user devices 506 can be included in a group of devices that synchronously presented media content, as described above in connection with FIGS. 1 and 2. In some such embodiments, a particular user device can be a leader device or a follower device. Additionally note that, a particular user device can be a leader device in connection with a cast session and a follower device in connection with a different cast session.

Although server 502 is illustrated as one device, the functions performed by server 502 can be performed using any suitable number of devices in some embodiments. For example, in some embodiments, multiple devices can be used to implement the functions performed by server 502.

Although two user devices 508 and 510 are shown in FIG. 5 to avoid over-complicating the figure, any suitable number of user devices, and/or any suitable types of user devices, can be used in some embodiments.

Server 502 and user devices 506 can be implemented using any suitable hardware in some embodiments. For example, in some embodiments, devices 502 and 506 can be implemented using any suitable general purpose computer or special purpose computer. For example, a mobile phone may be implemented using a special purpose computer. Any such general purpose computer or special purpose computer can include any suitable hardware. For example, as illustrated in example hardware 600 of FIG. 6, such hardware can include hardware processor 602, memory and/or storage 604, an input device controller 606, an input device 608, display/audio drivers 610, display and audio output circuitry 612, communication interface(s) 614, an antenna 616, and a bus 618.

Hardware processor 602 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 602 can be controlled by a server program stored in memory and/or storage of a server, such as server 502. In some embodiments, hardware processor 602 can be controlled by a computer program stored in memory and/or storage 604 of user device 506.

Memory and/or storage 604 can be any suitable memory and/or storage for storing programs, data, and/or any other suitable information in some embodiments. For example, memory and/or storage 604 can include random access memory, read-only memory, flash memory, hard disk storage, optical media, and/or any other suitable memory.

Input device controller 606 can be any suitable circuitry for controlling and receiving input from one or more input devices 608 in some embodiments. For example, input device controller 606 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 610 can be any suitable circuitry for controlling and driving output to one or more display/audio output devices 612 in some embodiments. For example, display/audio drivers 610 can be circuitry for driving a touchscreen, a flat-panel display, a cathode ray tube display, a projector, a speaker or speakers, and/or any other suitable display and/or presentation devices.

Communication interface(s) 614 can be any suitable circuitry for interfacing with one or more communication networks (e.g., computer network 504). For example, interface(s) 614 can include network interface card circuitry, wireless communication circuitry, and/or any other suitable type of communication network circuitry.

Antenna 616 can be any suitable one or more antennas for wirelessly communicating with a communication network (e.g., communication network 504) in some embodiments. In some embodiments, antenna 616 can be omitted.

Bus 618 can be any suitable mechanism for communicating between two or more components 602, 604, 606, 610, and 614 in some embodiments.

Any other suitable components can be included in hardware 600 in accordance with some embodiments.

In some embodiments, at least some of the above described blocks of the processes of FIGS. 1 and 2 can be executed or performed in any order or sequence not limited to the order and sequence shown in and described in connection with the figures. Also, some of the above blocks of FIGS. 1 and 2 can be executed or performed substantially simultaneously where appropriate or in parallel to reduce latency and processing times. Additionally or alternatively, some of the above described blocks of the processes of FIGS. 1 and 2 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for providing dynamic media sessions are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for media playback, the method comprising:
transmitting, from a leader device to a plurality of follower devices that each belong to a group of media playback devices in a group media playback session, control instructions that cause a media content item to be synchronously presented with the leader device and each of the plurality of follower devices in the group of media playback devices;

during the synchronous presentation of the media content item, receiving, by the leader device, an indication to halt playback of the media content item being presented by the leader device;

in response to receiving the indication to halt playback of the media content item being presented by the leader device, determining whether the leader device is to remain the leader device of the group of media playback devices in the group media playback session;

in response to determining that the leader device is to remain the leader device of the group of media playback devices, halting the playback of the media content item on the leader device while continuing to transmit, by the leader device, updated control instructions that cause the media content item in the group media playback session to continue being synchronously presented on the plurality of follower devices remaining in the group of media playback devices; and in response to determining that the leader device is not to remain the leader device of the group of media playback devices, designating, by the leader device, an updated leader device for the group media playback session, wherein the updated leader device is one of the follower devices of the group of media playback devices or a new device added to the group media playback session, and the leader device transmits a control instruction to the updated leader device that identifies an application that is to be executed on the updated leader device and that causes the updated leader device to initiate execution of the identified application, wherein executing said application causes instructions to be transmitted to the follower devices.

2. The method of claim 1, further comprising transmitting, by the leader device, a message to a server associated with the group media playback session that indicates an identifier of the follower device that is designated as the updated leader device.

3. The method of claim 1, further comprising stopping, by the leader device, transmitting instructions to the follower devices after determining that the updated leader device has initiated execution of the application.

4. The method of claim 1, wherein the media content item is presented by the leader device executing a first media playback application and wherein, in response to determining that the leader device is to remain the leader device of the group of media playback devices, the method further comprises:

receiving, at the leader device, a request to initiate a media playback session including a second media content item; and in response to receiving the request to initiate the media playback session including the second media content item, launching a second media playback application to present the second media content item, wherein the second media playback application is executing concurrently with the first media playback application on the leader device.

5. The method of claim 4, wherein the media playback session that includes the second media content item is a second group playback session with a second plurality of follower devices and wherein the leader device and the second plurality of follower devices are grouped in a second group of media playback devices.

6. The method of claim 5, wherein the second media playback application is configured to transmit control instructions that cause the second media content item to be synchronously presented with the leader device and each of the second plurality of follower devices in the second group of media playback devices while concurrently using the first media playback application to transmit the updated control instructions that cause the media content item in the group media playback session to continue being synchronously presented on the plurality of follower devices remaining in the group of media playback devices.

7. The method of claim 4, further comprising receiving an indication that one or more media resources are no longer being used at an application manager executing on the leader device, wherein the second media playback application initiates the presentation of the second media content item in response to receiving the request to initiate the media playback session including the second media content item and in response to receiving the indication that the one or more media resources are no longer being used.

8. The method of claim 4, further comprising:

inhibiting the first media playback application from being visible on the leader device in response to receiving the indication to halt playback of the media content item by the leader device, wherein the first media playback application was in a visible state when the media content item was being synchronously presented on the leader device and each of the plurality of follower devices in the group of media playback devices; and setting the second media playback application as a current media playback application for presenting the second media content item, wherein the second media playback application is in a visible state on leader device.

9. The method of claim 4, wherein the first media playback application and the second media playback application are instances of the same media playback application.

10. The method of claim 1, further comprising: in response to determining that the leader device is not to remain the leader device of the group of media playback devices, determining that the one of the follower devices of the group of media playback devices or the new device is capable of being designated as the leader device when the follower device or the new device is available to present media content.

11. The method of claim 10, wherein the leader device determines that the one of the follower devices of the group of media playback devices or the new device is capable of being designated as the leader device based at least in part on a type of media content being presented and whether the follower device or the new device is able to present the type of media content when the follower device or the new device is available to present media content.

12. A system for media playback, the system comprising:
a leader device having a hardware processor that:
transmits, from a leader device to a plurality of follower devices that each belong to a group of media playback devices in a group media playback session, control instructions that cause a media content item to be synchronously presented with the leader device and each of the plurality of follower devices in the group of media playback devices;

during the synchronous presentation of the media content item, receives an indication to halt playback of the media content item being presented by the leader device;

in response to receiving the indication to halt playback of the media content item by the leader device, determines whether the leader is to remain the leader device of the group of media playback devices in the group media playback session;

in response to determining that the leader device is to remain the leader device of the group of media playback devices, halts the playback of the media content item on the leader device while continuing to transmit, by the leader device, updated control instructions that cause the media content item in the group media playback session to continue being synchronously presented on the plurality of follower devices remaining in the group of media playback devices; and in response to determining that the leader device is not to remain the leader device of the group of media playback devices, designates an updated leader device for the group media playback session, wherein the updated leader device is one of the follower devices of the group of media playback devices or a new device added to the group media playback session, and the leader device transmits a control instruction to the updated leader device that identifies an application that is to be executed on the updated leader device and that causes the updated leader device to initiate execution of the identified application, wherein executing said application causes instructions to be transmitted to the follower devices.

13. The system of claim 12, wherein the hardware processor also causes transmitting a message to a server associated with the group media playback session that indicates an identifier of the follower device that is designated as the updated leader device.

14. The system of claim 12, wherein the hardware processor also stops transmitting instructions to the follower devices after determining that the updated leader device has initiated execution of the application.

15. The system of claim 12, wherein the media content item is presented by the leader device executing a first media playback application and wherein, in response to determining that the leader device is to remain the leader device of the group of media playback devices, the hardware processor also:
 receives, at the leader device, a request to initiate a media playback session including a second media content item; and
 in response to receiving the request to initiate the media playback session including the second media content item, launches a second media playback application to present the second media content item, wherein the second media playback application is executing concurrently with the first media playback application on the leader device.

16. The system of claim 15, wherein the media playback session that includes the second media content item is a second group playback session with a second plurality of follower devices and wherein the leader device and the second plurality of follower devices are grouped in a second group of media playback devices.

17. The system of claim 16, wherein the second media playback application is configured to transmit control instructions that cause the second media content item to be synchronously presented with the leader device and each of the second plurality of follower devices in the second group of media playback devices while concurrently using the first media playback application to transmit the updated control instructions that cause the media content item in the group media playback session to continue being synchronously presented on the plurality of follower devices remaining in the group of media playback devices.

18. The system of claim 15, wherein the hardware processor also receives an indication that one or more media resources are no longer being used at an application manager executing on the leader device, wherein the second media playback application initiates the presentation of the second media content item in response to receiving the request to initiate the media playback session including the second media content item and in response to receiving the indication that the one or more media resources are no longer being used.

19. The system of claim 15, wherein the hardware processor also:
 inhibits the first media playback application from being visible on the leader device in response to receiving the indication to halt playback of the media content item by the leader device, wherein the first media playback application was in a visible state when the media content item was being synchronously presented on the leader device and each of the plurality of follower devices in the group of media playback devices; and
 sets the second media playback application as a current media playback application for presenting the second media content item, wherein the second media playback application is in a visible state on leader device.

20. The system of claim 15, wherein the first media playback application and the second media playback application are instances of the same media playback application.

21. The system of claim 12, wherein, in response to determining that the leader device is not to remain the leader device of the group of media playback devices, the hardware processor also determines that the one of the follower devices of the group of media playback devices or the new device is capable of being designated as the leader device when the follower device or the new device is available to present media content.

22. The system of claim 21, wherein the leader device determines that the one of the follower devices of the group of media playback devices or the new device is capable of being designated as the leader device based at least in part on a type of media content being presented and whether the follower device or the new device is able to present the type of media content when the follower device or the new device is available to present media content.

23. A non-transitory, computer-readable medium containing computer executable instructions that, when executed by a processor, cause the processor to perform a method for media playback, the method comprising:
 transmitting, from a leader device to a plurality of follower devices that each belong to a group of media playback devices in a group media playback session, control instructions that cause a media content item to be synchronously presented with the leader device and each of the plurality of follower devices in the group of media playback devices;
 during the synchronous presentation of the media content item, receiving, by the leader device, an indication to halt playback of the media content item being presented by the leader device;
 in response to receiving the indication to halt playback of the media content item by the leader device, determining whether the leader is to remain the leader device of the group of media playback devices in the group media playback session;
 in response to determining that the leader device is to remain the leader device of the group of media playback devices, halting the playback of the media content item on the leader device while continuing to transmit updated control instructions by the leader device that cause the media content item in the group media playback session to continue being synchronously presented on the plurality of follower devices remaining in the group of media playback devices; and
 in response to determining that the leader device is not to remain the leader device of the group of media playback devices, designating an updated leader device for the group media playback session, wherein the updated leader device is one of the follower devices of the group of media playback devices or a new device added to the group media playback session, and the leader device transmits a control instruction to the updated leader device that identifies an application that is to be executed on the updated leader device and that causes the updated leader device to initiate execution of the identified application, wherein executing said application causes instructions to be transmitted to the follower devices.

* * * * *